United States Patent
Brandt et al.

(10) Patent No.: US 10,929,312 B2
(45) Date of Patent: *Feb. 23, 2021

(54) ZONE-SDID MAPPING SCHEME FOR TLB PURGES

(71) Applicant: International Business Machines Corporation, Armonk, NY (US)

(72) Inventors: Uwe Brandt, Stuttgart (DE); Ute Gaertner, Schoenaich (DE); Lisa C. Heller, Rhinebeck, NY (US); Markus Helms, Boeblingen (DE); Christian Jacobi, West Park, NY (US); Thomas Koehler, Holzgerlingen (DE); Frank Lehnert, Schoenbach (DE); Jennifer A. Navarro, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/404,779

(22) Filed: May 7, 2019

(65) Prior Publication Data

US 2019/0258588 A1 Aug. 22, 2019

Related U.S. Application Data

(63) Continuation of application No. 15/615,857, filed on Jun. 7, 2017, now Pat. No. 10,353,827.

(51) Int. Cl.
*G06F 12/10* (2016.01)
*G06F 12/121* (2016.01)
*G06F 12/14* (2006.01)
*G06F 12/0864* (2016.01)
*G06F 12/1027* (2016.01)

(52) U.S. Cl.
CPC ........ *G06F 12/121* (2013.01); *G06F 12/0864* (2013.01); *G06F 12/1027* (2013.01); *G06F 12/1441* (2013.01); *G06F 2212/683* (2013.01); *G06F 2212/7205* (2013.01)

(58) Field of Classification Search
None
See application file for complete search history.

(56) References Cited

U.S. PATENT DOCUMENTS 4,779,188 A 10/1988 Gum
8,412,911 B2 4/2013 Grohoski et al.
(Continued)

OTHER PUBLICATIONS

List of IBM Patents or Patent Applictions Treated as Related; (Appendix P), Filed May 7, 2019, 2 pages.

*Primary Examiner* — Kaushikkumar M Patel
(74) *Attorney, Agent, or Firm* — Cantor Colburn LLP; William Kinnaman

(57) ABSTRACT

Embodiments include techniques for using a zone-SDID mapping for translation lookaside buffer (TLB) purges, the techniques include receiving a zone purge request, including zone attribute information, and searching for matching zone attribute information in a zone register using the zone purge request. The techniques also include computing, based at least in part on the search, a state descriptor identifier (SDID) vector for each matching zone of the zone register, and reading TLB entries referenced in the zone purge request. The techniques include comparing an SDID of the TLB entry against an SDID specified in the SDID vector, and purging the TLB entries based on the comparison.

20 Claims, 6 Drawing Sheets

(56) References Cited

U.S. PATENT DOCUMENTS

| | | |
|---|---|---|
| 8,751,752 B2 | 6/2014 | Cota-Robles et al. |
| 9,092,382 B2 | 7/2015 | Deutschle et al. |
| 2006/0112212 A1 | 5/2006 | Hildner |
| 2006/0294288 A1 | 12/2006 | Seth |
| 2007/0055844 A1 | 3/2007 | Dong |
| 2007/0101099 A1 | 5/2007 | Shinohara |
| 2008/0320316 A1 | 12/2008 | Fertig et al. |
| 2009/0228743 A1 | 9/2009 | Ponnuswamy |
| 2016/0048453 A1 | 2/2016 | Koehler et al. |
| 2018/0018280 A1 | 1/2018 | Bradbury |
| 2018/0357181 A1 | 12/2018 | Brandt et al. |
| 2018/0357182 A1 | 12/2018 | Brandt et al. |

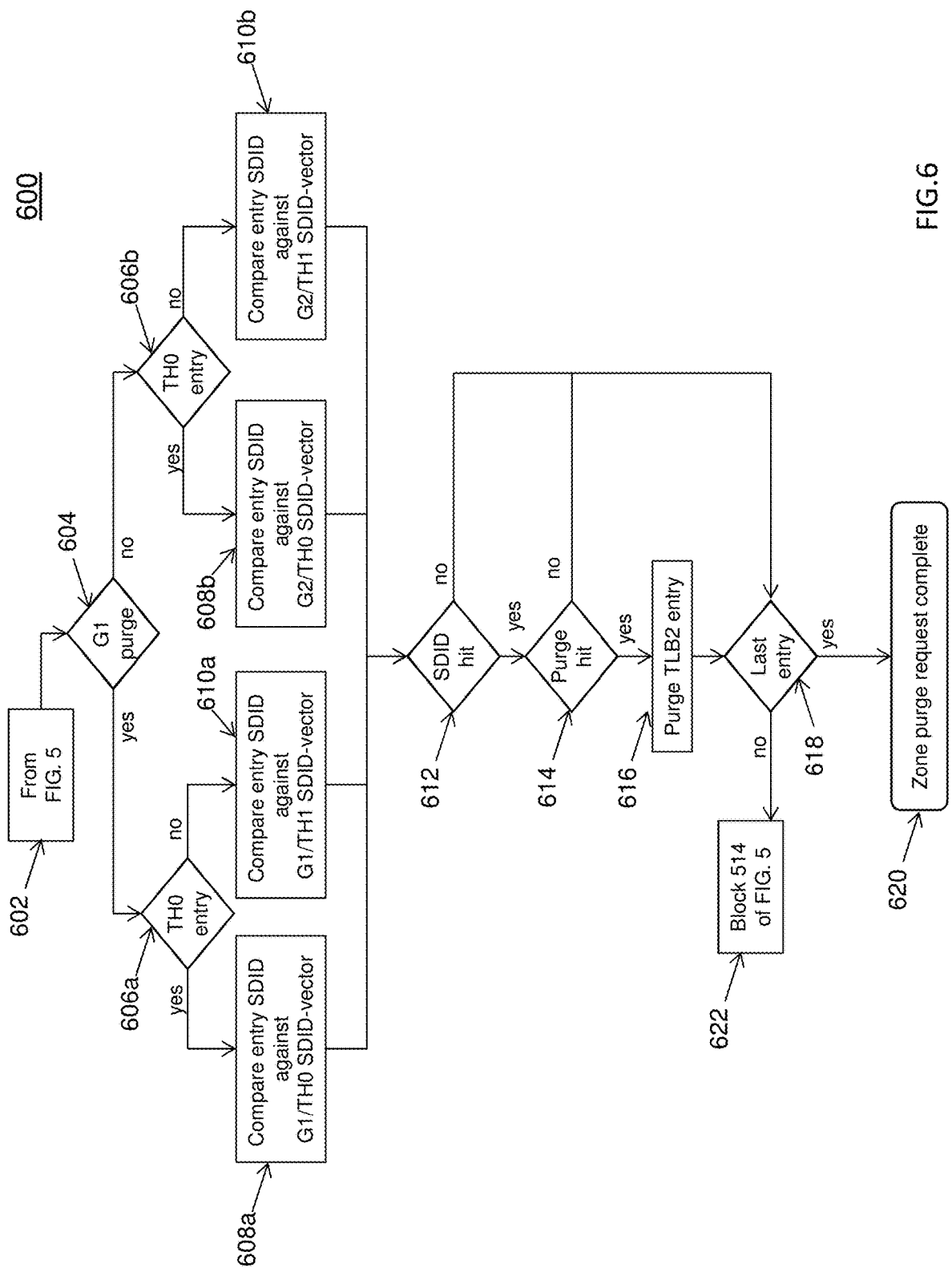

US 10,929,312 B2

ZONE-SDID MAPPING SCHEME FOR TLB PURGES

DOMESTIC PRIORITY

This application is a continuation of U.S. patent application Ser. No. 15/615,857, filed Jun. 7, 2017, the content of which is incorporated by reference herein in its entirety.

BACKGROUND

The present invention generally relates to computing systems, and more specifically, to using a state descriptor identifier (SDID) mapping scheme for translation lookaside buffer (TLB) purges requiring a zone compare.

In many computer systems, central processing units (CPUs) can be dynamically assigned to different tasks and/or virtualization levels. A translation lookaside buffer (TLB) is a cache in a CPU that is used to improve the speed of virtual address translations. The most recently accessed address translations are stored in the TLB so that page tables and other translation tables do not have to be accessed from the CPU's main memory increasing the speed and efficiency of the computer system's processing.

For various reasons, the operating system executed by the CPU may need to purge all associated TLB entries of the task the CPU is currently assigned to. In this case, it may be desirable to keep TLB entries of a particular set of tasks but purge only those entries associated with the current task.

SUMMARY

Embodiments of the present invention are directed to a computer-implemented method for using a zone-SDID mapping for translation lookaside buffer (TLB) purges. A non-limiting example of the computer-implemented method includes receiving a zone purge request, including zone attribute information, and searching for matching zone attribute information in a zone register using the zone purge request. The computer-implemented method also includes computing, based at least in part on the search, a state descriptor identifier (SDID) vector for each matching zone of the zone register, and reading TLB entries referenced in the zone purge request. The computer-implemented method includes comparing an SDID of the TLB entry against an SDID specified in the SDID vector, and purging the TLB entries based on the comparison.

Embodiments of the present invention are directed to a system for using a zone-SDID mapping for translation lookaside buffer (TLB) purges. A non-limiting example of the system includes a translation lookaside buffer including a zone register, a combined region and segment-table entries, and page table entries, a storage medium, the storage medium being coupled to a processor. The system also includes the processor being configured to receive a zone purge request, including zone attribute information, and search for matching zone attribute information in a zone register using the zone purge request. The system includes compute, based at least in part on the search, a state descriptor identifier (SDID) vector for each matching zone of the zone register, and read TLB entries referenced in the zone purge request. The system also includes compare an SDID of the TLB entry against an SDID specified in the SDID vector, and purge the TLB entries based on the comparison.

Embodiments of the invention are directed to a computer program product for using a zone-SDID mapping for translation lookaside buffer (TLB) purges, the computer program product comprising a computer readable storage medium having program instructions embodied therewith. The program instructions are executable by a processor to cause the processor to perform a method. A non-limiting example of the method includes receiving a zone purge request, including zone attribute information, and searching for matching zone attribute information in a zone register using the zone purge request. The computer-implemented method also includes computing, based at least in part on the search, a state descriptor identifier (SDID) vector for each matching zone of the zone register, and reading TLB entries referenced in the zone purge request. The computer-implemented method includes comparing an SDID of the TLB entry against an SDID specified in the SDID vector, and purging the TLB entries based on the comparison.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 6 depicts a flow chart for using zone-SDID mapping for TLB purges in accordance with an embodiment.

Figure 1:
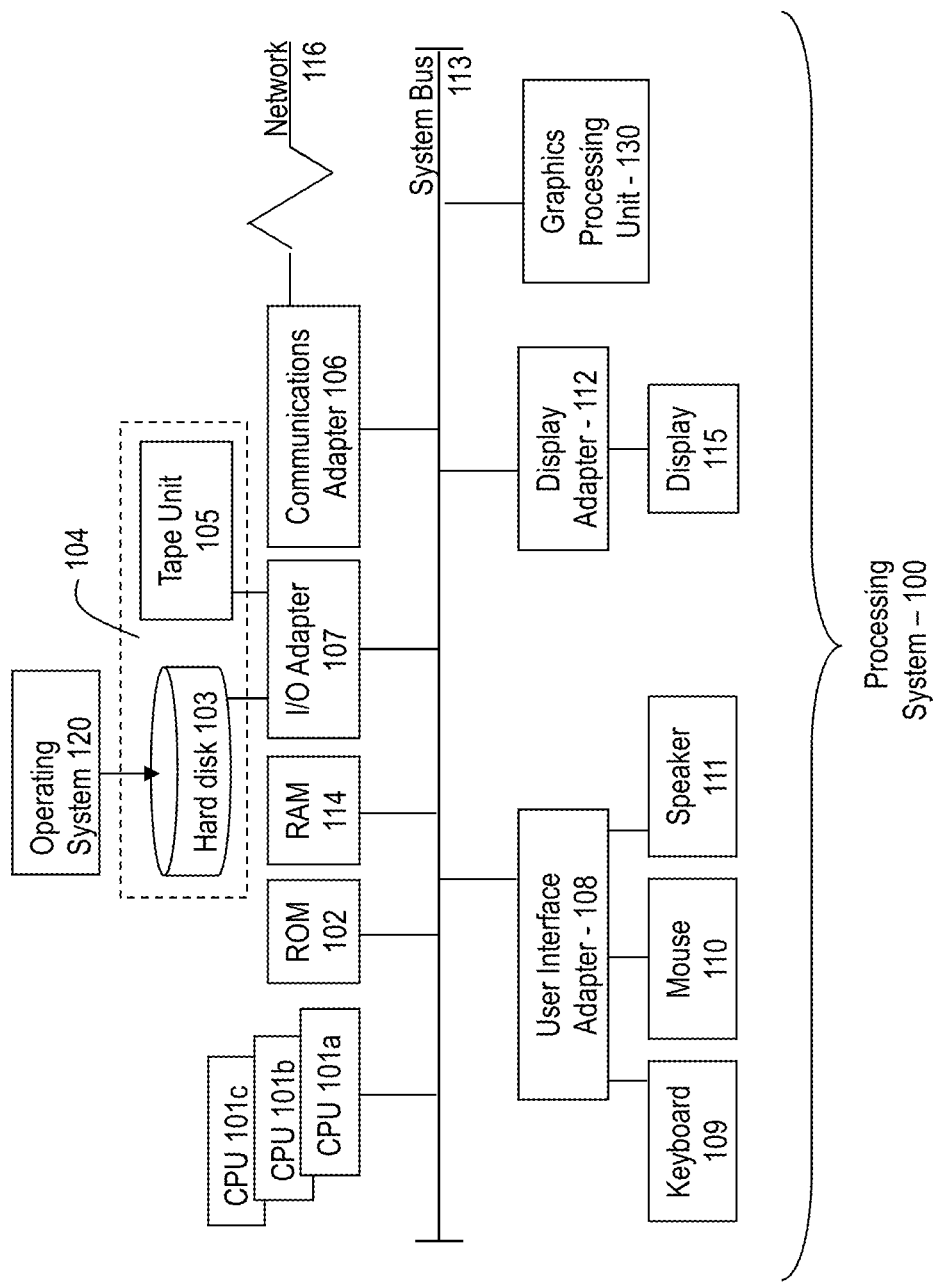
FIG. 1 depicts a block diagram illustrating one example of a processing system for practice of the teachings herein.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

During a conventional purge operation, a purge request is received that includes zone information, where the zone information identifies the partition in which a logical PU is operating for purge operations. In the event a hashed SDID value, actually describing a logical PU, results in the same SDID being associated, the TLB needs to be purged. The zone information does not help in the scenario a new logical PU runs in the same logical partition as the previous logical PU having the same hashed SDID. The zone information of the purge request is compared to the zone information stored with each entry in the TLB. The zone information is 8-bits (7-bits zone information and 1-bit parity) and must be stored with each entry in the TLB combined region and segment-table entries (CRSTE). These additional bits are only used for the purging operation. If the comparison reveals a match, the entries can be purged and removed from the TLB CRSTE. Also, because the conventional method for accomplishing a zone purge requires the zone information to be stored, the zone purge operation incurs additional processing time because the zone information must be searched for against each entry in the TLB.

In today's environment, TLB CRSTEs are linked to zone registers entries to store the zone information. The entries of the zone register are configured to provide valid and invalid bits, where a valid bit indicates that a link will be maintained to TLB CRSTE entries and an invalid bit can indicate that a link to TLB CRSTE entries is not maintained. The zone register is indexed and organized by the SDID information where the technique described herein leverages this configuration to generate the zone-SDID mapping. Because the zone register can be indexed by SDIDs, a one-to-one zone-SDID mapping exists. The information in the existing zone register is leveraged to modify the conventional purge operation by using the zone-SDID mapping.

Conventionally, prior systems are configured to store zone information that is exclusively used for purge operations. This information adds to the overhead needed to store with each entry and increases the purge operation time because a search is performed through each entry and every entry to locate the matching zone information.

The TLB includes the elements of the zone register, CRSTE, and the PTE. There are four compartments of the TLB (shown in FIG. 2) each storing address translations, where each entry stores the zone information. During the purge operation, four read operations must be performed to search for the zone information associated with a purge request. Upon locating the matching zone information in the TLB entry, the entries can be purged. The techniques described herein obviate the need to store the zone information for each entry of the TLB.

In particular, the TLB CRSTE entries store the 8-bit zone number information for each entry. This information takes up a substantial amount of storage capacity and increases the duration for performing the purge operation as each entry must be searched. In order to perform the search operation, each entry of each of the four compartments must be searched because the CRSTE is structured in multiple arrays. For example, the CRSTE includes a lookup array and a payload array, where SDID information is stored in lookup array and can be accessed in parallel. The zone number information can be stored in the payload array which is not accessed in parallel adding to increased processing times. The cost of storing zone information and increased purged times are incurred using the conventional method.

In one or more embodiments, the zone information is no longer required to be stored in the TLB entries of the TLB CRSTE to identify the appropriate ZONE for purging. The zone attribute information of the purge request is used to generate an SDID vector from a zone register which provides a zone-SDID mapping. The SDID in the TLB associated with the purge request is compared to the SDID corresponding to a position of the SDID vector and in the event a match results the entries are purged. The described techniques are performed beyond the prior art.

Turning now to an overview of the aspects of the invention, one or more embodiments of the invention address the above-described shortcomings of the prior art by performing a purge operation by leveraging an existing SDID-zone mapping.

One or more aspects of the invention include leveraging an SDID-zone map for executing a purge operation. A zone purge operation is executed without storing zone number information with each of the TLB CRSTE entries. The zone information included in the purge request is used to access a zone register to compute an SDID vector. Because the zone register is organized by SDIDs, a zone-SDID mapping can be determined. The entry associated with the purge request is read out of the TLB CRSTE and compared to an SDID associated with respective positions of the SDID vector. If a match is determined, the entries associated with the SDID can be purged, thereby purging the entries associated with a logical PU operating in the zone.

The above-described aspects of the invention address the shortcomings of the prior art by exploiting an existing zone-SDID mapping for zone purge operations. By leveraging the existing zone-SDID information of the zone register, the zone number information no longer needs to be stored for each TLB entry.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/0) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

Figure 2:
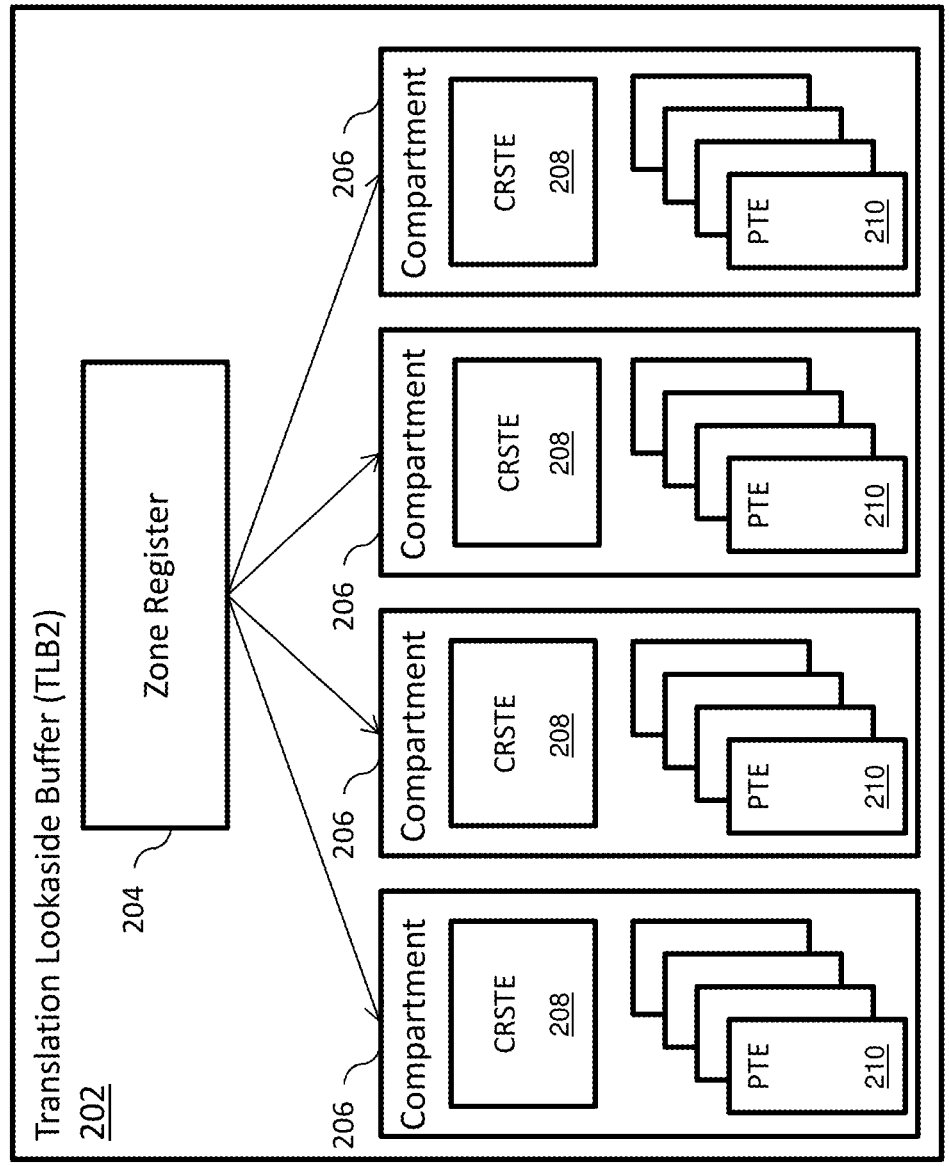
FIG. 2 depicts a TLB used when performing a zone-SDID mapping for TLB purges in accordance with an embodiment.

FIG. 2 shows a translation lookaside buffer (TLB) 202 configured to store virtual address mappings for multiple logical processors.

The translation lookaside buffer 202 is hierarchically structured and comprises zone register 204, an upper level named as CRSTE 208, and a lower level named as PTE 210. This organization is in compliance with the ESA/390 and z/Series architecture, which specifies that translation lookaside buffer entries may be of the type "combined region and segment-table entries" (CRSTE) or "page-table entries" (PTE). It is also in accordance with the fully hierarchical translation lookaside buffer model described in the EDAT-2 architecture. In the shown embodiment, the organization of the upper level CRSTE of the translation lookaside buffer 202 is 512×4 w (4-way set associative) for a total of 4×512=2048 entries (page-table origins), for example. In the drawings, one CRSTE column is called a compartment. The lower PTE 210 is linked to a CRSTE/compartment of the translation lookaside buffer 202, having a 6-way set associative organization and 256 array entry-bits for a total of 256×6=1536 entries (absolute address, etc.), and the four CRSTE compartments 206 comprise 4×1536=6144 PTE entries. This hierarchical structure provides parallel look-up of the CRSTE 208 and PTE 210 of the translation lookaside buffer 202. The link between the CRSTE 208 and the PTE 210 of the second level translation lookaside buffer 202 is accomplished by storing the CRSTE index address as address tag data in the PTE 210 of the translation lookaside buffer 202. The zone register 204 includes a plurality of entries which are organized according to guest level and thread level. Each of the entries includes zone information, valid entry information, tag information, etc. The zone register 204 is coupled to each CRSTE 208 to maintain SDID/ZONE information associated with the CRSTE entries. In one or more embodiments, the zone register is configured as a content addressable memory (CAM).

Figure 3:
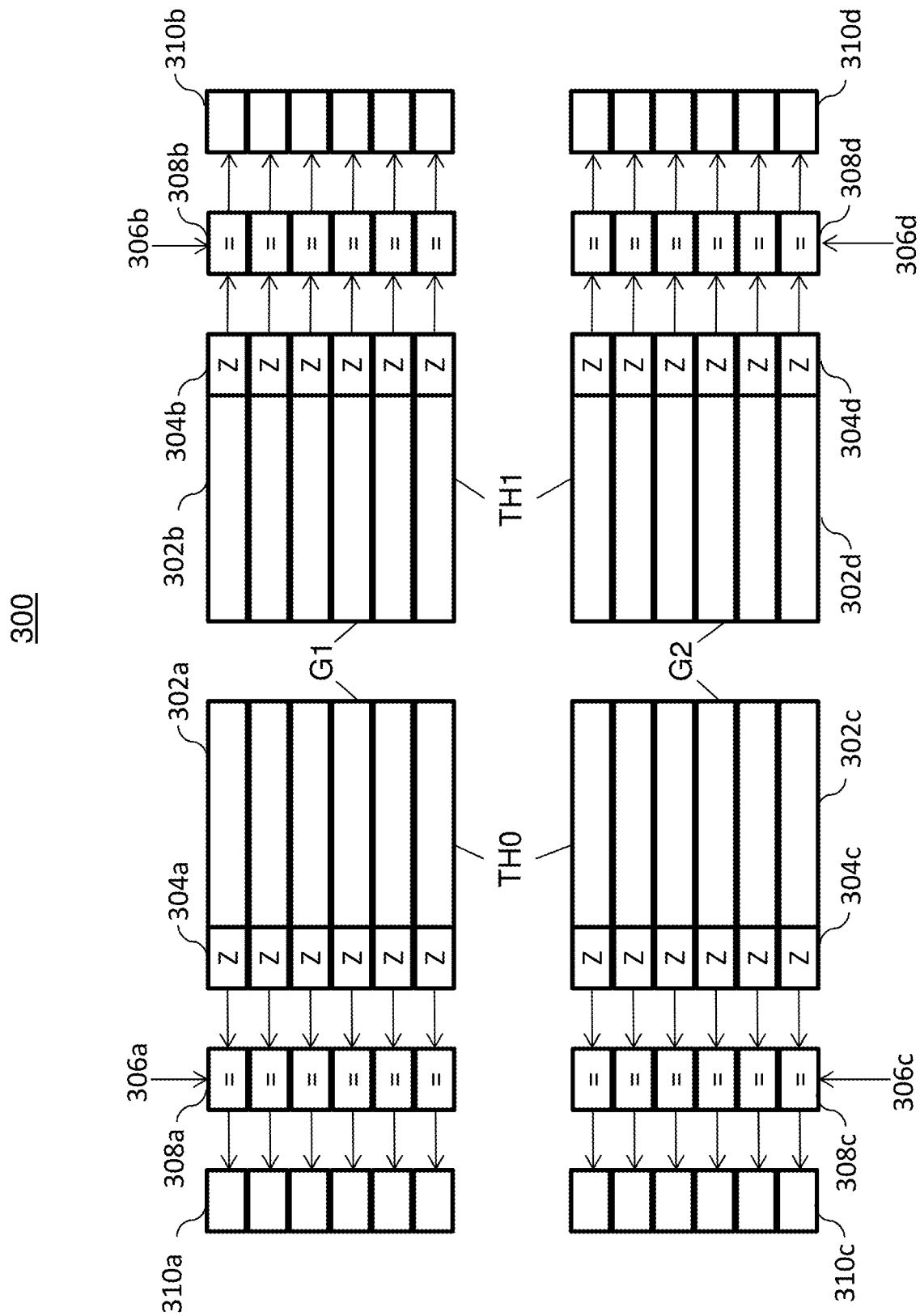
FIG. 3 depicts a zone register for zone-SDID mapping for TLB purges in accordance with an embodiment.

Now referring to FIG. 3, a zone register 300 used for zone-SDID mapping for TLB purges is shown. In one or more embodiments, the zone register 300 is structured by SIE-level (G1, G2) and thread identifier (TH0, TH1). The zone register 300 is structured according to guest levels and thread level. As a non-limiting example, the zone register 300 can hold up to 16 logical PU's per SIE-level and thread. The zone register 300 can be configured as a plurality of CAMs. In this example, there are four CAMs (a, b, c, d) that are organized according to the guest level G1, G2 and thread level TH0, TH1. Each entry of the zone register 300 can be indexed by an SDID and further includes zone information 304. Because the zone register 300 is organized and indexed by SDIDs, a zone-SDID mapping can be leveraged. The zone register 300 is used to indicate whether a link exists between the zone register 300 and the CRSTE 208 of FIG. 2. If a valid bit exists, the entry FIG. 3 provides the generation of SDID vectors.

In accordance with one or more embodiments, a purge request 306 is compared to the zone information 304 of the zone register 300 to compute an SDID vector 310. In one or more embodiments, the SDID vector 310 includes 16 bits representing the 16 entries for each guest level. Element 308 provides a compare operation. If the zone information 304 of the zone register 302 matches the zone information associated with a purge request, the position of the SDID vector 310 is set to '1.' Otherwise the bit in the corresponding position is set to '0.' In one or more embodiments, the zone register can hold up to 16 logical PUs per SIE-level and thread. In an example, a purge request can request to purge thread 0 and thread 1 for a given zone G1. Since the zone register is indexed by SDIDs, the SDIDs in the vector can be directly mapped by their position. For example, if SDID vector has bit '0' and '15' set then SDID_0 and SDID_15 are running in the specified purge zone.

After the SDID vector 310 is computed, the SDID of the SDID vector 310 indicating a '1' is compared to the SDID of the entry of the TLB CRSTE entry. If there is a hit, the entry can be purged. The process is repeated for each SDID of the SDID vector 310 indicating a '1.' If there is no hit, the TLB entries are not purged. In one or more embodiments, additional information of the purge request must be matched prior to completing the purge. For example, the matching information can include additional purge criteria such as the logical address (LA), address space control element (ASCE), etc.

Figure 4:
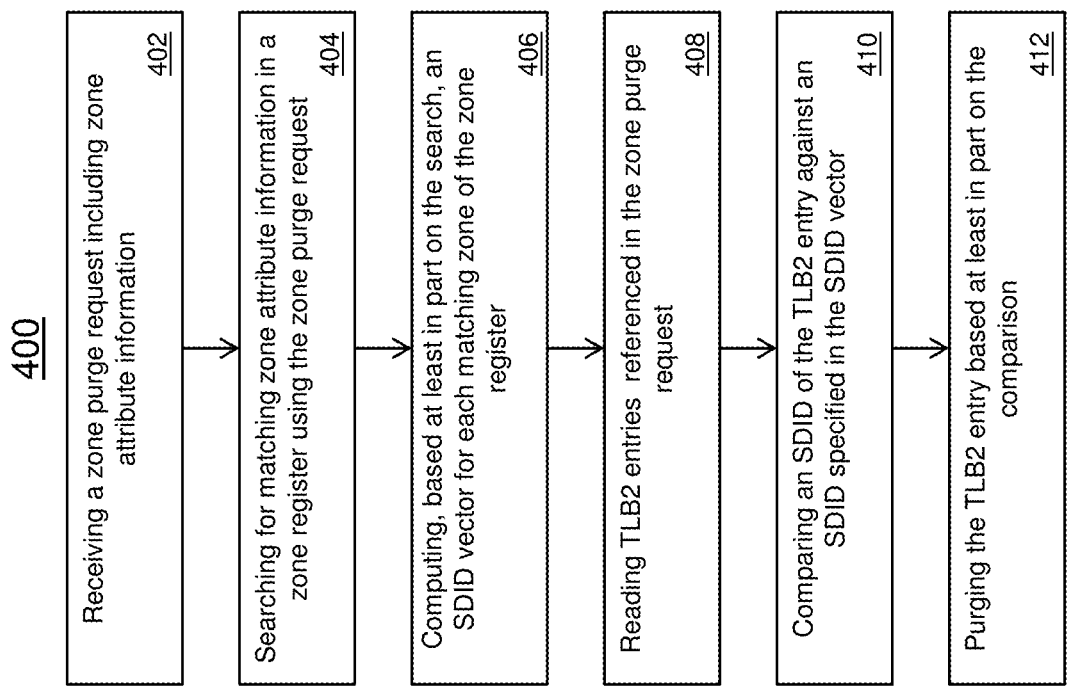
FIG. 4 depicts a flow diagram for using zone-SDID mapping for TLB purges in accordance with an embodiment.

Now referring to FIG. 4, a method 400 for using zone-SDID mapping for TLB purges in accordance with an embodiment is shown. Block 402 includes receiving a zone purge request. In one or more embodiments, a zone purge request can include an additional purge qualifiers such as a purge TLB of address space control element (PTOA), invalidate data address translation entries (IDTE), and/or an invalidate page table entries (IPTE) request. The purge request can also include information related to the guest level and/or thread ID for purging.

Block 404 provides searching for matching zone attribute information in a zone register using the zone purge request. In one or more embodiments, the zone register is organized according to SDIDs and operate as separate CAMs. Because the zone register is indexed by the SDIDs a one-to-one mapping exists between the zone information and SDID.

Block 406 includes computing, based at least in part on the search, an SDID vector for the zone register. In one or more embodiments, the zone register is configured to hold 16 entries per guest level. Therefore, the SDID vector associated with a guest level will have 16 bits representing each location of the zone register. Each bit of the SDID vector is mapped to a corresponding position in the zone register.

Based on whether the TLB entry belongs to TH0 or TH1 and based on whether the purge request is for G1 or G2, one of the following SDID vectors is taken:

G1 purge, TLB entry belongs to TH0, then take G1/TH0 SDID vector;
G1 purge, TLB entry belongs to TH1, then take G1/TH1 SDID vector;
G2 purge, TLB entry belongs to TH0, then take G2/TH0 SDID vector; and
G2 purge, TLB entry belongs to TH1, then take G2/TH1 SDID vector.

Block 408 provides reading TLB entries referenced in the zone purge request. Because the SDIDs are stored in the compartments that store the CRSTE, a parallel read operation can be performed to obtain the SDID associated with the purge request.

Block 410 provides comparing an SDID of the TLB entry against an SDID specified in the SDID vector. In an embodiment, if a bit in the SDID vector is set to '1' then the SDID of that position in the zone register is compared to the SDID of the TLB entry. In other words, the SDID located in the position in the zone register corresponding to the bit position of the SDID vector is compared to the SDID entry of the TLB CRSTE associated with the purge request. For example, if a purge request indicates s(x)=10, the $10^{th}$ entry of the TLB CRSTE is read to obtain the SDID stored in the $10^{th}$ entry. If these two SDIDs match, then a purge operation is performed for the entries. In the event the two SDIDs do not match, a purge operation is not performed.

Block 412 provides purging the TLB entry based at least in part on the comparison. If an SDID hit occurs, meaning the SDID of the TLB CRSTE entry associated with the purge request matches the SDID of the SDID vector, then a purge hit is determined where the entry in the TLB will be purged. In another embodiment, a purge hit can be determined after matching additional information between the TLB CRSTE entry and the purge request such as address space control element (ASCE) or logical address (LA), etc.

In one or more embodiments, the entries will be read out and compared to the SDID vector until the last entry has been analyzed. After the processing of each entry, the zone purge request is executed and completed.

Figure 5:
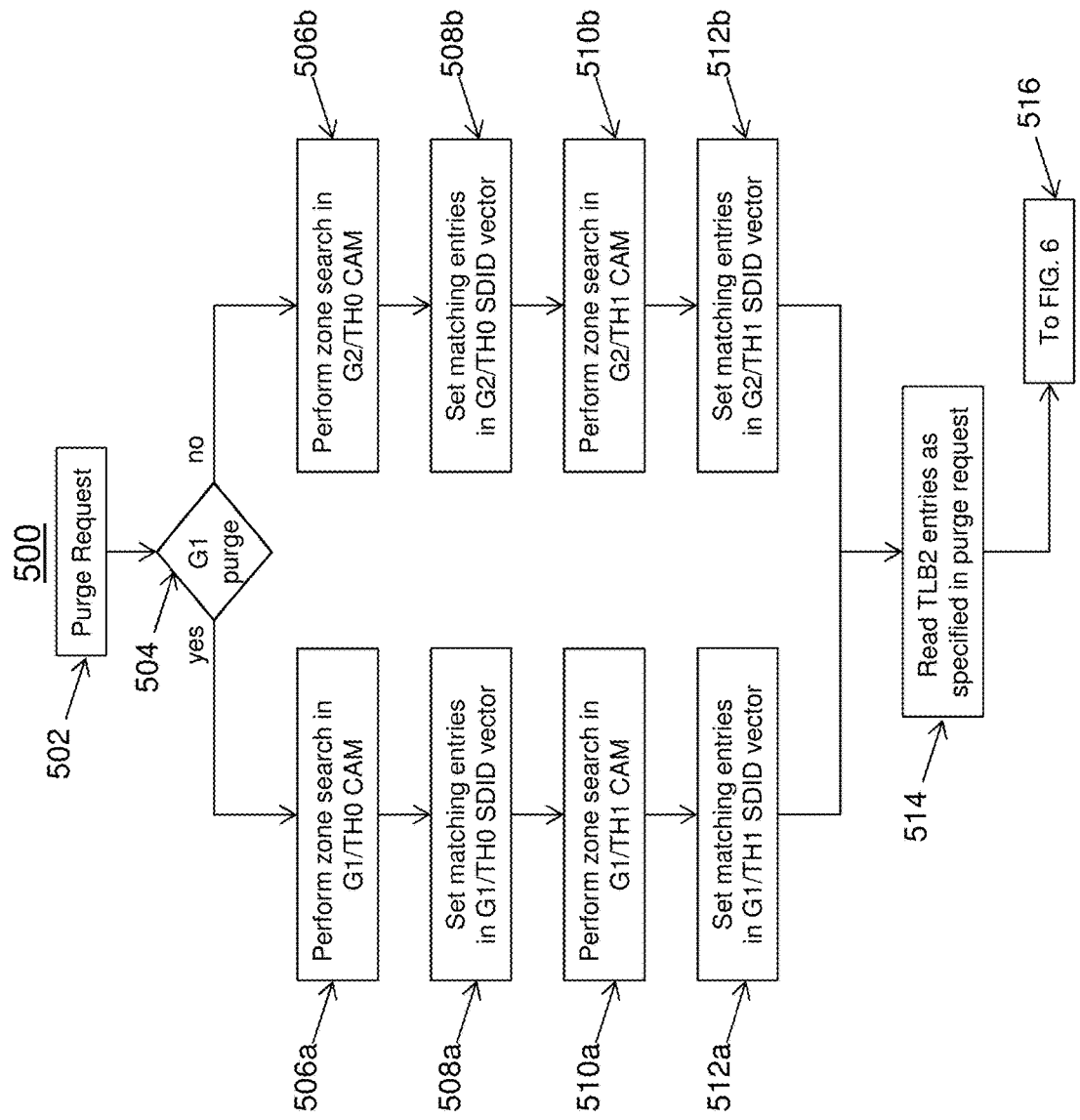
FIG. 5 depicts a flow chart for using zone-SDID mapping for TLB purges in accordance with an embodiment.

Now referring to FIG. 5, a flow chart 500 for using zone-SDID mapping for TLB purges in accordance with an embodiment is shown. The process begins at block 502, which provides receiving a purge request. In an example, the purge request can include zone attribute information such as guest level information and/or the thread level information which can be used to perform a search in one of the CAMs of the zone register.

At decision block 504, it is determined whether the purge request is associated with guest level 1 (G1). In one or more embodiments, the guest level is associated with a guest operating system. If the purge request is associated with G1, the process continues to block 506a, otherwise the purge request is associated with G2 and the process continues to 506b.

If the purge request is for a G1 purge, the block 506a provides performing a zone search in the zone register in the G1/TH0 CAM portion (the top left quadrant of FIG. 3). Next, block 508a provides setting matching entries in a G1/TH0 SDID vector. Block 510a provides performing a zone search in the G1/TH1 CAM (top right quadrant of FIG. 3) and block 512a continues by setting matching entries in the G1/TH1 SDID vector.

If, at decision block 504, the purge request is not for a G1 purge, block 506b provides performing a zone search in the G2/TH0 CAM portion (bottom left quadrant of FIG. 3) of the zone register. Next, block 508b provides setting matching entries in a G2/TH0 SDID vector. Block 510b provides performing a zone search in the G2/TH1 CAM (bottom right quadrant of FIG. 3) and block 512b continues by setting matching entries in the G1/TH1 SDID vector.

As the process continues, block 514 provides reading the TLB entries of the CRSTE specified in the purge request and advances to block 516.

Now referring to FIG. 6, flow chart 600 for using zone-SDID mapping for TLB purges in accordance with an embodiment is shown. Block 602 is continued from FIG. 5 and advances the process to decision block 604 which determines whether the TLB entry is associated with G1. If so, the process continues to a secondary decision block 606a to determine whether the TLB entry is associated with a thread TH0. Based on the determination, the flow will continue to block 608a to compare the TLB entry SDID against the G1/TH0 SDID vector or to block 610*a* to compare the TLB entry SDID against the G1/TH1 SDID vector.

In the event the determination at block 604 results in the TLB entry not being associated with the G1 (being associated with G2), the process continues to a secondary decision block 606*b* to determine whether the TLB entry is associated with a thread TH0. Based on the determination, the flow will continue to block 608*b* to compare the TLB entry SDID against the G2/TH0 SDID vector or to block 610*b* to compare the TLB entry SDID against the G2/TH1 SDID vector.

Next, the process continues to block 612, where it an SDID hit is determined. If the TLB SDID entry is the same as the SDID of the SDID vector, then a hit is determined and the process continues to decision block 614. If an SDID hit is not determined, the process continues to block 618.

At decision block 614, a purge hit is determined and at block 616 the TLB entry is purged. At decision block 614, additional information can be checked to determine whether a purge hit has occurred. For example, information including ASCE, PTO, etc. can be matched prior to purging the entry. If the additional information matches then a purge hit results. At block 618, it is determined if the last entry has been reached. If so, the zone purge request is completed at block 620. Otherwise, the process continues to block 622 to repeat the process flow.

Conventionally, zone information is stored for each TLB entry. However, the zone information is only used for a purging operation. The reverse look-up operation performed by the techniques described herein no longer requires that zone information be stored with each TLB entry. The invention makes use of information that is already stored in the TLB entry obviating the need to store zone information with each entry. In addition, parallel searches can be performed to obtain the SDID information thereby improving the purge operation speed.

The techniques described herein improve the utilization of the array area for storing the TLB CRSTE entries and power management of the CPU. The zone information no longer needs to be stored in TLB CRSTE/2G-TLB. In addition, the efficiency of performing a purge operation is improved. The overall efficiency of the address translation management within the system/computer is increased. The parallel read operation performed during purging improves the purge execution time. Without this technique, the zone number information is required to be maintained for each entry in the TLB CRSTE, increasing the purge operation time, and consuming unnecessary system power.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for using a zone-SDID mapping for translation lookaside buffer (TLB) purges, the computer-implemented method comprising:
    receiving zone attribute information;
    matching zone attribute information in a zone register;
    computing a state descriptor identifier (SDID) vector for each matching zone of the zone register;
    comparing an SDID of the TLB entry associated with the zone attribute information against an SDID specified in the SDID vector; and
    purging the TLB entry based on the comparison.

2. The computer-implemented method of claim 1, wherein zone attribute information includes at least one of thread or guest attribute information.

3. The computer-implemented method of claim 1, further comprising receiving a zone purge request including at least one of an additional purge qualifier.

4. The computer-implemented method of claim 1, further comprising excluding a TLB entry from storing zone information in a combined region and segment-table entry portion of the TLB.

5. The computer-implemented method of claim 1, wherein the zone register is implemented as separate content addressable memories.

6. The computer-implemented method of claim 1, wherein the comparison is based on matching SDIDs and at least one of an additional purge criterion.

7. The computer-implemented method of claim 1, wherein the SDID identifies at least one of a logical processing unit or virtual processor.

8. A system for using a zone-SDID mapping for translation lookaside buffer (TLB) purges, the system comprising:
    a translation lookaside buffer;
    a storage medium, the storage medium being coupled to a processor;
    the processor configured to:
        receive zone attribute information;
        search for matching zone attribute information in a zone register using the zone purge request;
        compute a state descriptor identifier (SDID) vector for each matching zone of the zone register;
        compare an SDID of the TLB entry associated with the zone attribute information against an SDID specified in the SDID vector; and
        purge the TLB entry based on the comparison.

9. The system of claim 8, wherein the zone attribute information includes at least one of thread or guest attribute information.

10. The system of claim 8, wherein the processor is further configured to receive a zone purge request that includes at least one of an additional purge.

11. The system of claim 8, wherein the processor is further configured to exclude a TLB entry from storing zone information in a combined region and segment-table entry portion of the TLB.

12. The system of claim 8, wherein the zone register is implemented as separate content addressable memories.

13. The system of claim 8, wherein the comparison is based on matching SDIDs and at least one of an additional purge criterion.

14. The system of claim 8, wherein the SDID identifies at least one of a logical processing unit or virtual processor.

15. A computer program product for using a zone-SDID mapping for translation lookaside buffer (TLB) purges, the computer program product comprising:
    a computer readable storage medium having stored thereon first program instructions executable by a processor to cause the processor to:
        receive zone attribute information;
        matching zone attribute information in a zone register;
        compute, based at least in part on the search, a state descriptor identifier (SDID) vector for each matching zone of the zone register;
        compare an SDID of the TLB entry associated with the zone attribute information against an SDID specified in the SDID vector; and
        purge the TLB entry based on the comparison.

16. The computer program product of claim 15, wherein the zone attribute information includes at least one of thread or guest attribute information.

17. The computer program product of claim 15, wherein the processor is further configured to receive a zone purge request including at least one of an additional purge qualifier.

18. The computer program product of claim 15, wherein the processor is configured to exclude a TLB entry from storing zone information in a combined region and segment-table entry portion of the TLB.

19. The computer program product of claim 15, wherein the comparison is based on matching SDIDs and at least one of an additional purge criterion.

20. The computer program product of claim 15, wherein the SDID identifies at least one of a logical processing unit or virtual processor.

* * * * *